Feb. 10, 1953     R. F. COOK, JR     2,627,768
WIRE STRIPPER
Filed Oct. 19, 1950
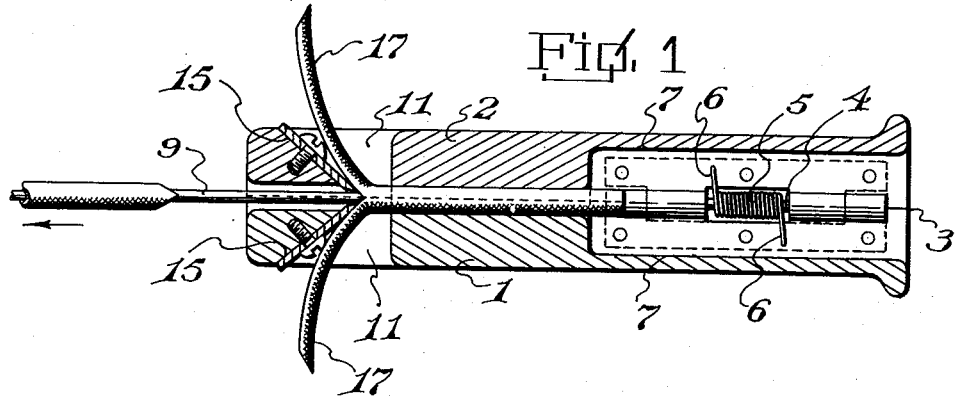
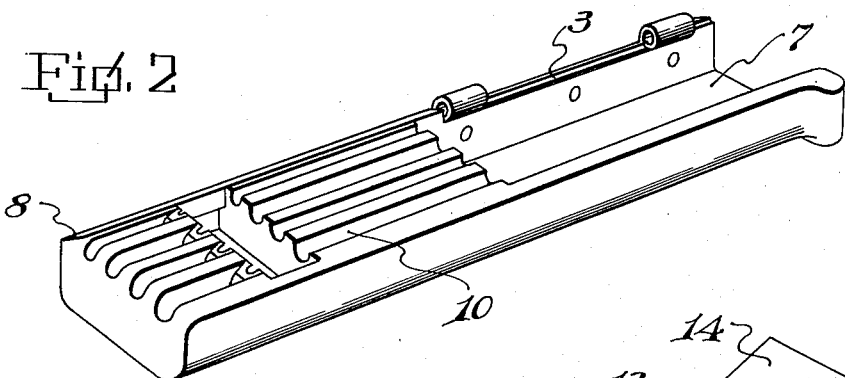
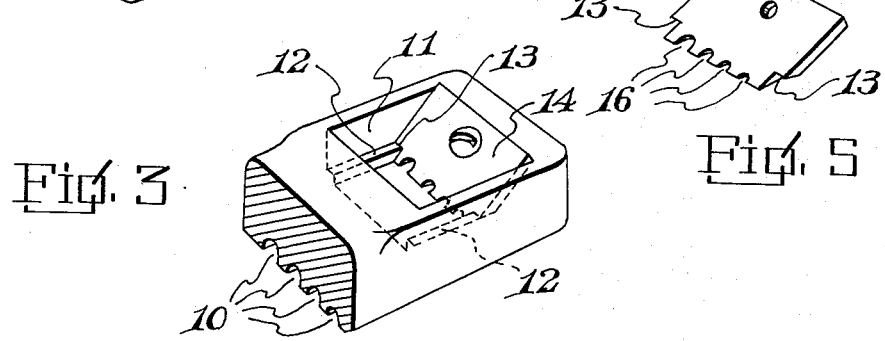
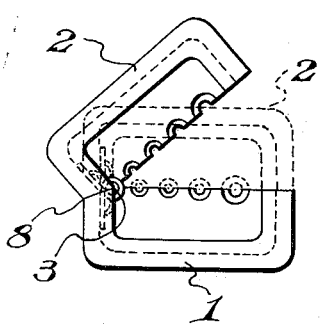
Robert F. Cook Jr.
INVENTOR
ATTORNEY Patented Feb. 10, 1953

2,627,768

UNITED STATES PATENT OFFICE 2,627,768

WIRE STRIPPER

Robert F. Cook, Jr., Tulsa, Okla.

Application October 19, 1950, Serial No. 190,935

1 Claim. (Cl. 81—9.5)

The invention relates to strippers for stripping insulation from the ends of electrical wires preparatory to making various electrical connections, and has for its object to provide a device of this kind comprising hingedly connected sections, each section having longitudinal grooves for the reception of different size wire and angularly disposed stripping blades carried by each section, said blades having arcuate cutting edges in alignment with the grooves for cutting and stripping the insulation from the wire on opposite sides of the wire.

A further object is to provide a wire insulation stripper comprising hingedly connected sections, between which sections the wire passes during a stripping operation, and spring means on the hinged side of the device and forming means for normally urging the hinged sections apart so a wire can be readily and quickly placed in the device for its stripping operation.

A further object is to provide a wire stripper which, in a single unit, will strip various sizes of wire.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a vertical longitudinal sectional view through the stripper, showing an insulated wire in the stripper.

Figure 2 is a perspective view of the lower section of the stripper.

Figure 3 is a detail perspective view of the blade end of the upper stripper section.

Figure 4 is a view in elevation of the rear end of the stripper showing the hinged sections in open position.

Figure 5 is a perspective view of one of the stripper blades.

Referring to the drawing, the numeral 1 designates the lower stripper section and 2 the upper section. These sections register and are elongated as shown in Figure 2. Sections 1 and 2 are hingedly connected together along one longitudinal edge at 3, and on a hinged pin 4, and surrounding said hinge pin is a coiled spring 5, the ends 6 of said spring cooperate with the walls of the registering chambers 7 of the stripper sections 1 and 2 and normally urge the stripper sections to open position as shown in Figure 4 until the hinged action is stopped by the engagement of the sections at 8. The advantage of this particular feature is that the device is always open so that ends of wires 9 to be stripped may be moved laterally into the device to be received in the corresponding guide grooves 10 of the stripper members 1 and 2, said grooves registering when the sections 1 and 2 are forced together and held by the operator, during a stripping operation.

The forward ends of the members 1 and 2 are provided with transverse openings 11 having longitudinal shoulders 12 therein. The shoulders 12 are engaged by the end shoulders 13 carried by opposite sides of the forwardly converging stripper blades 14, which blades are detachably held against the inclined surfaces 15 of the sections 1 and 2 within the registering openings 11. The adjacent edges of the stripper blades 14 are provided with various sized cutting recesses 16, which recesses register with the grooves 10 in the members 1 and 2 and arch the wire 9, so that when the wire 9 is moved to the left by the operator, or the stripper to the right, the insulation 17 is stripped from the wire, therefore it will be seen that the insulation can be easily and quickly stripped from the wire, and the notches 16 of the blades will be of the proper size, according to the size of the wire 9 and the insulation to be stripped.

Referring to Figure 4, it will be noted that the small groove 10 is adjacent the hinging point, therefore it will be seen that the device will not have to open so far, as would be the case were the large grooves adjacent the hinging point. The device will easily close by a simple gripping action, and the final closing will force the knives into the insulation without engaging or cutting the conductor wire proper.

From the above it will be seen that a wire stripper is provided which will receive and strip different sized wires, and one which is simple in construction and positive in its operation.

The invention having been set forth what is claimed as new and useful is:

A wire stripper comprising hingedly connected sections, said sections being hinged together along one side thereof, the inner faces of said sections being provided with longitudinally extending grooves, the groove of each section registering when the sections are hinged to closed registering position against each other, openings extending transversely through the hinged sections adjacent one end thereof and registering with each other when the sections are closed, downwardly and inwardly inclined converging blades within each of said openings, the adjacent cutting edges of the blades terminating in arcuate registering cutting recesses in alignment with the grooves and positioned whereby insulation will be stripped from a wire when the wire is placed in the grooves and the stripper or wire moved longitudinally apart, spring means on the hinged side of the sections for normally urging the sections to open position and means for limiting the amount of opening of the sections in relation to each other.

ROBERT F. COOK, Jr.

REFERENCES CITED

The following references are of record in the file of this patent:

UNITED STATES PATENTS

| Number | Name | Date |
|---|---|---|
| 419,270 | Low | Jan. 14, 1890 |
| 520,212 | McKenzie | May 22, 1894 |
| 1,396,903 | Weber | Nov. 15, 1921 |
| 1,814,589 | Endsley | July 14, 1931 |
| 2,120,398 | Edwards et al. | June 14, 1938 |
| 2,410,252 | Torrence | Oct. 29, 1946 |